T. L. BURTON.
BRAKE BEAM SUSPENSION.
APPLICATION FILED MAY 18, 1917.
1,364,071.
Patented Jan. 4, 1921.
2 SHEETS—SHEET 1.
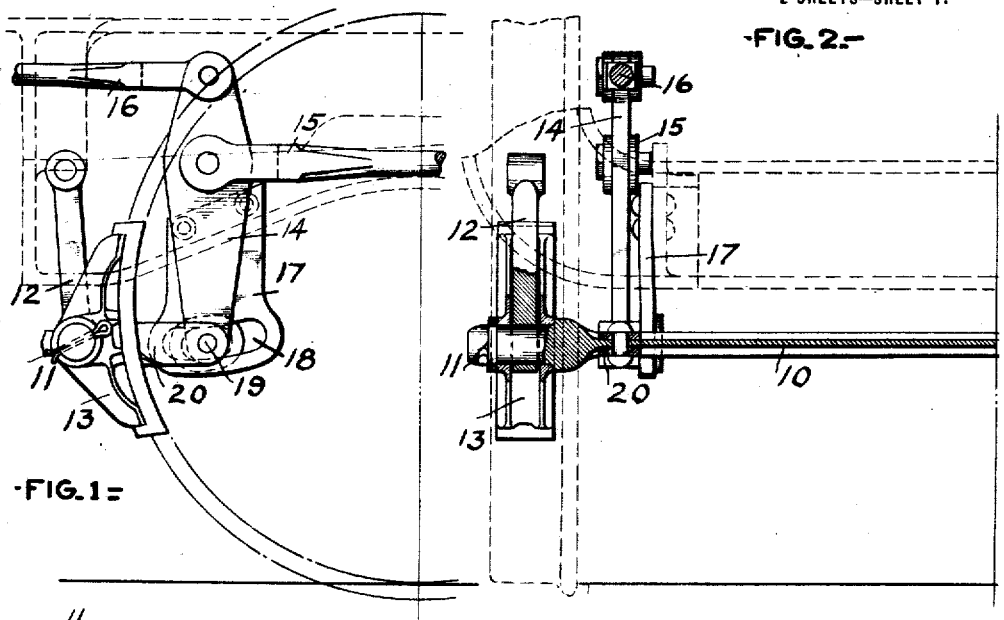
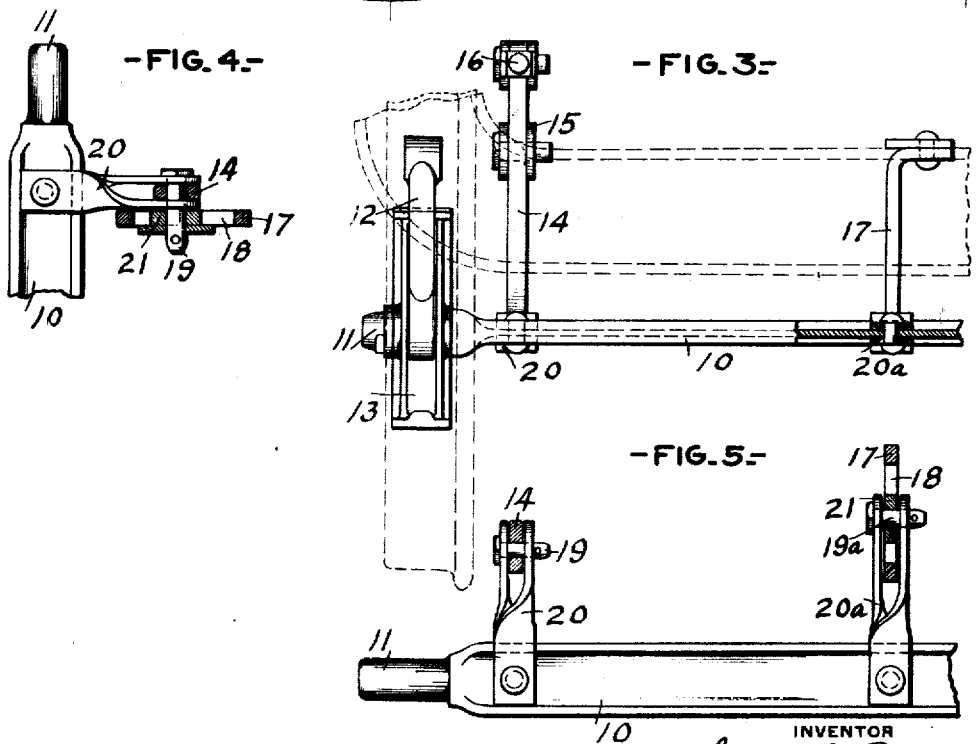
INVENTOR
Thomas L. Burton.
by Edward H. Wright,
Atty T. L. BURTON.
BRAKE BEAM SUSPENSION.
APPLICATION FILED MAY 18, 1917.
1,364,071.
Patented Jan. 4, 1921.
2 SHEETS—SHEET 2.
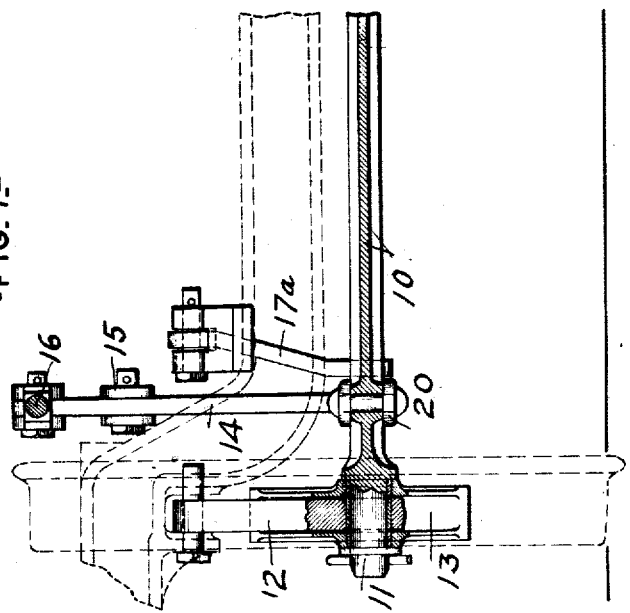
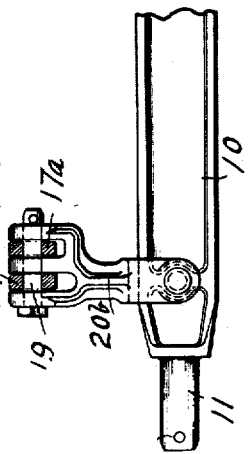
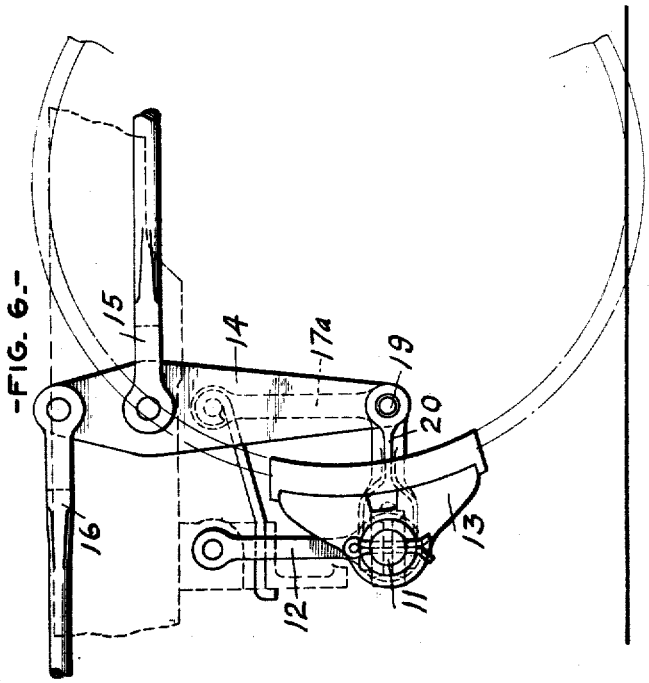
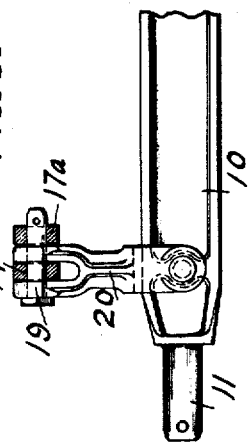
INVENTOR
Thomas L. Burton.
by Edward A. Wright.
Atty

UNITED STATES PATENT OFFICE.

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-BEAM SUSPENSION.

1,364,071.   Specification of Letters Patent.   Patented Jan. 4, 1921.

Application filed May 18, 1917. Serial No. 169,408.

*To all whom it may concern:*

Be it known that I, THOMAS L. BURTON, a citizen of the United States, residing at St. Louis, in the State of Missouri, have invented certain new and useful Improvements in Brake-Beam Suspensions, of which improvement the following is a specification.

This invention relates to suspension means for brake beams for railway cars, and more particularly to that form of brake beam in which the brake shoes are pivoted upon trunnions at the opposite ends of the beam, one of the objects being to provide improved means for maintaining the beam in a substantially parallel relation as the brake beam and shoe are moved toward the wheel in the application movement and away from the same during the release action whereby the shoe will remain substantially concentric to the wheel under the various conditions of wear of the brake shoe and the wheel.

It has heretofore been proposed to provide, in addition to the two hangers at the ends of the beam, an intermediate or central hanger pivotally connected to a special jaw at the middle portion of the beam, but according to one of the features of my improvement this special jaw may be eliminated and one or more additional hangers fastened to the truck frame may also be connected to the same jaw and pin as the regular truck lever, particularly where there are two sets of truck rods and levers, one at each side of truck. Another feature comprises an improved form of additional hanger which may be employed at either the side, intermediate or middle portion of the beam.

In the accompanying drawings, Figure 1 is a side elevation of a brake beam suspension embodying my improvement; Fig. 2, an end elevation showing half the brake beam in longitudinal section; Fig. 3, a similar view showing a modified design with the additional hanger at the middle of the brake beam; Fig. 4, a detail view showing in horizontal section the connection between the improved hanger and the brake beam; Fig. 5, a similar horizontal sectional view of the modification shown in Fig. 3; Fig. 6, a side elevation similar to Fig. 1, but showing a modified form of additional hanger; Fig. 7, an end view of the same with the brake beam shown in longitudinal section; Fig. 8, a detail view in plan showing one form of jaw and its connections with the hanger and truck brake lever; and Fig. 9, a similar view showing a slightly modified form of jaw.

As shown in Figs. 1, 2 and 4, I have shown an ordinary form of brake beam 10, having trunnions 11, at its ends, on which are pivotally mounted the brake heads 13. The usual hangers 12, pivotally connected to the brake beam or brake head and to the truck frame, serve as a support for the same and permit a free swinging movement.

Where the usual type of clasp brake rigging is employed, with two sets of truck levers and rods, one on each side of the truck, such as truck levers 14, and rods 15 and 16, which parts are duplicated at each side of each pair of wheels, the brake beams are provided with rigidly connected jaws 20, for pivotal connection with the lower ends of said truck levers, as will be readily understood.

In accordance with my improvement an additional hanger is provided for the brake beam, and in order to prevent the beam from tipping, this additional hanger is connected to the jaws of the beam. As shown in Figs. 1, 2 and 4, this improved additional hanger is in the form of a plate 17, rigidly attached to the truck frame and provided with a curved slot 18, at its lower end, the same being located in close proximity to the truck lever 14, and the pivot pin 19, at the bottom thereof extending within said curved slot 18. This slot is preferably curved on the arc of a circle with a radius equivalent to that of the hanger 12, whereby a parallelogram is formed and the brake beam will maintain a normal parallel relation during its swinging movement to and from the wheels in the application and release of the brakes.

This also serves as an additional support for the brake rigging. A bearing piece 21, is preferably mounted on the pin 19, within the slot 18, and the same is provided with a flange which guides the piece within the slot.

If desired this additional hanger plate may be located at the middle portion of the brake beam, as shown in Figs. 3 and 5, in which case the hanger plate 17, is connected to an additional jaw 20$^a$, by means of the pin 19$^a$ passing through the slot 18.

In the modification shown in Figs. 6 and 7, the additional hanger is in the form of a link 17ª, pivoted to the frame and also to the connecting pin 19, between the bottom of the truck lever 14 and the jaw 20, which may be either single, as in Fig. 8, or double as indicated at 20ᵇ, in Fig. 9.

The improved hanger plate with curved slot has the advantage of giving a more secure support for the brake rigging and at the same time may be used in many truck designs where the pivoted link is inapplicable. It also serves to maintain the parallel relation of the brake beam, with the brake shoe concentric with the wheel under the various conditions of wear of the shoe and wheel.

The particular form of construction shown in Figs. 6, 7, 8 and 9 is not specifically claimed herein, but is specifically claimed in my co-pending divisional application Ser. No. 381,542, filed May 15, 1920.

Having now described by invention, what I claim as new and desire to secure by Letters Patent is:

1. In a brake device, the combination with a brake beam having hangers at its opposite ends and provided with a jaw, of a truck brake lever pivotally attached to said jaw, and an additional hanger connected to said jaw.

2. In a brake device, the combination with a brake beam having hangers at its opposite ends, of two sets of truck levers one at each side of the truck, jaws on said beam connected to said truck levers, and additional hangers also connected to said jaws.

3. In a brake device, the combination with a brake beam having trunnions at its opposite ends, of brake heads and hangers pivotally mounted on said trunnions, jaws on said beam, truck levers pivotally connected with said jaws, and additional hangers also connected to said jaws.

4. In a brake device, the combination with a brake beam having hangers at its opposite ends and provided with a jaw, a hanger plate rigidly secured to the truck frame and provided with a slot, and a pin on said jaw extending within the said slot in the hanger plate.

5. In a brake device, the combination with a brake beam having hangers and provided with jaws, of two sets of truck brake levers, one at each side of the truck, pivotally connected with said jaws, hanger plates rigidly secured to the truck frame and provided with slots at their lower ends, and pins on said jaws engaging within the slots in said hanger plates.

6. In a brake device the combination of a brake beam having hangers and provided with a jaw, a truck brake lever for said jaw, a hanger plate rigidly secured to the truck frame and provided with a curved slot at its lower end, and a pivot pin connecting the jaw and lever and engaging within the slot in the hanger plate.

7. In brake mechanism, the combination of a frame, wheels carrying said frame, brake mechanism having brake beams applied to both sides of each pair of wheels, fulcrum members operatively connected to said brake beams near the ends of the latter, levers pivotally connected to said fulcrum members, and a supported hanger pivotally connected to the fulcrum members.

8. In a truck, a brake rigging including a brake beam, heads disposed adjacent the extremities of said beam for coöperation with wheels, fulcrum arms carried by the beam adjacent the heads and extending forwardly from the beam, supporting members connected to the fulcrum arms in front of the beam and to truck portions to support the beam, and members supported on the fulcrum arms for transmitting operative movement to the beam.

9. In a brake mechanism, the combination of a brake beam having a fulcrum member, a brake lever, and a supporting hanger, the brake lever and supporting hanger being connected to said fulcrum member on a common center.

10. In brake mechanism, the combination of a frame, a brake beam, a brake head carried thereby, a link member connecting the frame and head, a brake lever, a supporting hanger, and a member connected to said brake beam at one end and at its other end connected to said brake lever and to said hanger.

11. In brake mechanism, the combination of a brake beam, a member, one end of which is operatively connected thereto, a brake lever, a supporting hanger, and a single pin connecting said brake lever and hanger to the other end of said member whereby the brake mechanism is held in suspension.

In testimony whereof I have hereunto set my hand.

THOMAS L. BURTON.